Oct. 13, 1959 — C. A. SCHELLENS — 2,908,515
SHAFT SEAL
Filed Aug. 9, 1955
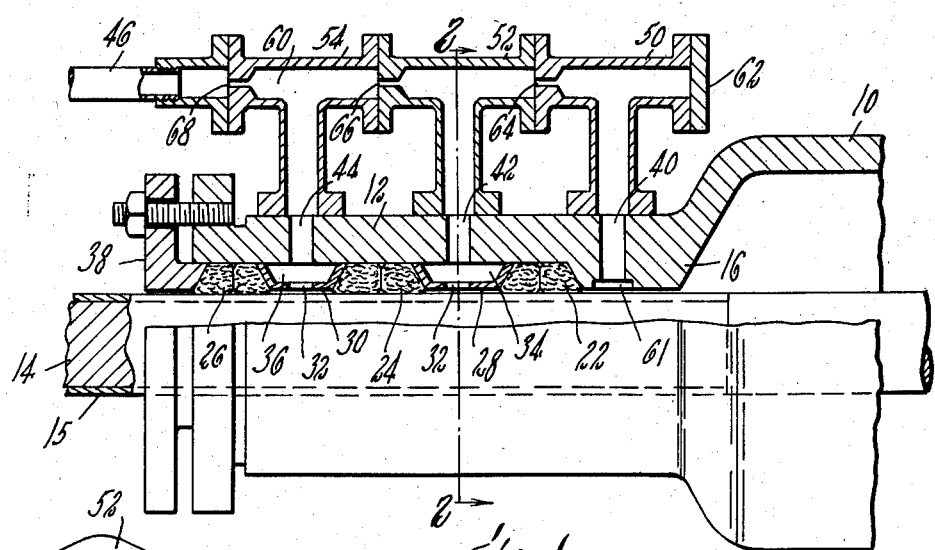
Fig. 1.
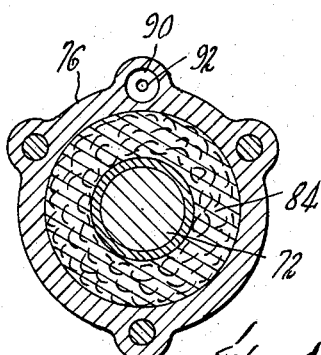
Fig. 2.
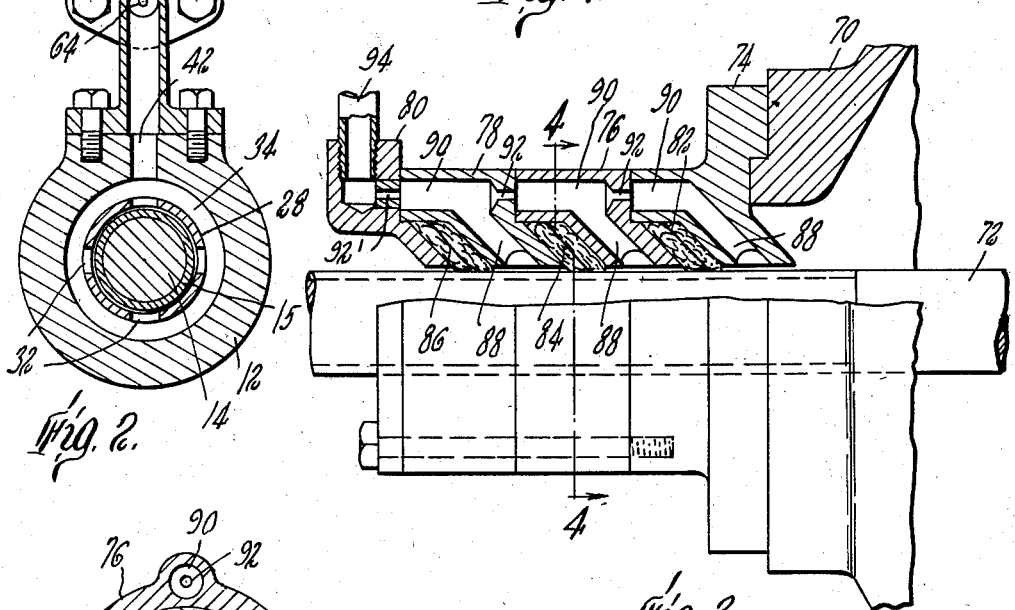
Fig. 3.
Fig. 4.
Inventor
Christopher A. Schellens
by Wright, Brown, Quinby & May
Attys.

2,908,515
SHAFT SEAL

Christopher A. Schellens, St. George, Maine; Belton A. Copp, executor of said Christopher A. Schellens, deceased Application August 9, 1955, Serial No. 527,301

2 Claims. (Cl. 286—8)

This invention relates to an improved seal for a shaft which protrudes from a casing containing liquid under pressure and which may rotate or reciprocate or both. An object of the invention is to provide an improved sealing means which will function effectively for continuous high speed operation of the shaft and high pressures in the liquid within the casing. For example, many rotary feed-water pumps for steam boilers are operated at high speeds to deliver feed water at high pressures. Stuffing boxes containing soft packing are provided to prevent excessive leakage along the shaft where it protrudes from the box. In cases where the shaft is rotated at high speeds, a slight leakage along the shaft is permitted for the purpose of lubricating and cooling the packing. In such cases there is a progressive drop in liquid pressure in the axial direction, the rate of pressure drop per unit length of the packing being a measure of the unit pressure by which the packing bears against the shaft. Thus if the liquid pressure at the entrance to the packing is large and the axial length of the packing is small, the unit rubbing pressure of the packing on the shaft is large, with the result that the packing soon grooves the shaft. Efforts to remedy this situation by lengthening the packing box are apt to be unsuccessful for high speed operation since the heat generated by the friction between the packing and shaft tends to vaporize the leakage liquid toward the outer end of the box with the result that the packing at this point becomes heated and burns, blowing out of the box in a fine powder. This continues until enough of the packing has been blown out to establish a substantial leakage and a higher rubbing pressure at the entrance of the packing.

According to the invention, the packing is divided into axially spaced sections of equal axial length each of which is supplied with sufficient leakage liquid to keep all of the packing wet, the liquid pressure being progressively reduced by equal steps so that the pressure drop across each section of packing is the same. For a more complete understanding of the invention, reference may be had to the following description thereof and to the drawing, of which:

Figure 1 is an elevational view of an embodiment of the invention, partly broken away to show in section;

Figure 2 is a section on the line 2—2 of Figure 1;

Figure 3 is an elevation of a modified form of the invention, partly broken away to show in section; and Figure 4 is a section on the line 4—4 of Figure 3.

On the drawing, 10 represents a portion of a casing usually containing a liquid under pressure, as for example, the casing of a feed water pump for a steam boiler. An extension 12 of the casing is a stuffing box surrounding a portion of a shaft 14 which projects out from the casing 10 and may be rotatable or reciprocable or both. In accordance with common practice, the portion of the shaft 14 which extends through the box is provided with a wear sleeve 15 which is shrunk or otherwise secured thereon. Such a sleeve takes the rubbing wear and can be replaced without having to renew the entire shaft. In the specification and claims, the word "shaft" is used to refer to the entire shaft structure, whether or not such structure includes a replaceable sleeve on a portion thereof. The portion 16 of the stuffing box which adjoins the casing 10 fits closely about the shaft 14, the radial clearance being preferably about .005", more or less. The portion of the box 12 beyond the closely fitting portion 16 is interiorly relieved to form a substantial clearance about the shaft extending to the end of the box remote from the casing 10. Within the box 12 is a series of packing groups, each group consisting of one or more soft packing rings around the shaft, three such groups 22, 24 and 26 being shown by way of example. Between each two successive groups is a lantern ring, two such rings 28 and 30 being shown in Figure 1. Each lantern ring has one or more perforations 32. The lantern rings act as spacers between the successive packing groups and define spaced chambers 34 and 36 within the box 12. A gland 38 is mounted at the outer end of the box 12 and presses adjustably against the packing group 26, which pressure is transmitted to the other packing groups through the lantern rings. The gland is preferably adjusted to permit a slight leakage along the shaft past the packing rings to keep the rings from overheating from friction. To keep all the packing rings properly moistened without excessive leakage past the gland 38, radial passages 40, 42, and 44 are provided through the closely fitting portion 16 of the stuffing box and from the chambers 34 and 36, respectively. These passages communicate at spaced points with a duct leading to an outlet which may be in the form of a discharge pipe 46 communicating with the atmosphere outside of the casing. The duct may be conveniently formed by connecting together a series of T-fittings 50, 52 and 54. These fittings communicate respectively with the passages 40, 42 and 44. The fittings are secured to the box 12 and to one another so that their transverse passages together with the passage 40 form a duct 60 leading from an annular groove 61 in the box around the shaft near its junction with the casing, and discharging into the outlet pipe 46. The vertical passages in the fittings 52 and 54 are branches of the duct 60 leading to the chambers 34 and 36 respectively. One end of the fitting 50 is blanked off as at 62. The other end is provided with a constriction forming a small orifice 64 through which must pass the liquid flowing from the fitting 50 to the fitting 52. Similar constrictions in the fittings 52 and 54 restrict the outflow of liquid therefrom. The liquid from the groove 61 approaching the orifice 64 is substantially at the same pressure as that inside the casing 10, and the pressure drops progressively as the liquid passes successively through the orifices 64, 66 and 68 to the outlet pipe 46. The cross-sectional area of the orifice 64 is substantially less than the area of the clearance between the closely fitting portion 16 of the stuffing box and the shaft 14. For example, if the radial clearance about a 1½" shaft is .005", the area of the clearance is .0236 square inch. The orifice 64 may be made with 1/16" diameter, in which case its area would be .003 square inch or about one eighth of the area of the clearance. The orifices 66 and 68 of the other T-fittings are preferably the same size as the orifice 64. The pressure drop through each orifice is the same and, the pressure in the discharge pipe 46 is substantially atmospheric since the discharge pipe leads to a collecting tank (not shown) or other disposal means at atmospheric pressure. Hence the pressure drop across each packing group is equal to the total pressure to be sealed divided by the number of packing groups, in this case three. The unit rubbing pressure against the shaft is therefore reduced proportionately. The reduced pressure differential across each packing group reduces the leakage as compared with what it would be if the total pressure drop were across a single packing, and there is only a slight leakage past the outer packing group 26. The packing rings are apt to vary so that some will leak more than others. Thus for example if the middle group 24 leaks more than the others, there may be a flow downward through the middle T 52 and the holes 32 in the lantern ring 28 and an upward flow from the chamber 36 into the T 54, but this will not be sufficient to disturb the division of the total pressure into thirds. Each group of the packing rings, including the outer group 26, is assured of a sufficient supply of liquid to keep it lubricated and cooled.

The narrow clearance between the closely fitting part 16 of the stuffing box and the shaft 14 acts as a filter to prevent particles in the casing from getting to the orifices 64 in such size as to clog them since the width of the clearance is much less than the diameter of the orifices. Hence any particle large enough to clog an orifice will be either held back by the stuffing box or ground up between the box and the shaft. The clearance is thus a perpetually self-cleaning strainer.

A modified form of the invention is shown in Figures 3 and 4. To the casing 70 from which a shaft 72 projects is secured a stuffing box consisting of a number of sections 74, 76, 78, and 80, bolted together. Between the successive sections are spaces for groups of conically shaped packing rings 82, 84 and 86 of the self-sealing type which are dry when first inserted but swell when wet by the liquid so that they substantially fill the spaces between the sections. Two rings are shown in each group. Due to the conical shape of these rings the pressure differential across them has the effect of pressing them against the shaft 72, thereby sealing it. Each section 74, 76 and 78 of the box fits closely on the shaft and has a passage 88 opening into a discharge duct 90 formed by the sections collectively, there being a constricted orifice 92 between successive sections to restrict the flow of liquid to a discharge pipe 94, the operation of this stuffing box is substantially the same as that of the box shown in Figure 1, an adequate quantity of liquid being supplied to each of the packing rings for lubrication and cooling, while the three equal orifices 92 and 92' insure that the pressure drop across each ring is one third of the total pressure to be sealed by the box.

One obvious advantage of the invention is that it greatly increases the range of pressures that can be practically and successfully sealed, whether the seal employs a plurality of soft packing rings or a plurality of carbon rings seated against metal surfaces. Each type of seal when subjected to a high rubbing speed has its practical limitations as to the amount of pressure which can be sealed. By arranging $n$ seals in series and cascading the pressure drops across them in equal decrements, in accordance with the invention, the practical limit of sealing pressure is increased $n$-fold.

I claim:

1. In combination with a casing adapted to contain liquid under pressure, a shaft extending from said casing to the outside thereof, and a stuffing box surrounding the exterior portion of said shaft adjacent to said casing, said stuffing box having a closely fitting portion immediately adjacent to said casing and continued in an interiorly relieved portion; a plurality of axially spaced seals around said shaft within said interiorly relieved portion of said box defining a plurality of chambers in said box, one between each two successive seals, to receive liquid leaking from said casing along the surface of said shaft, and means for maintaining substantially uniform drop in liquid pressure from the interior of the casing to the innermost of said chambers, from each said chamber to the next chamber more remote from said casing, and from the outermost chamber to the atmosphere outside of said casing, said means comprising a duct having an inlet communicating with the interior of said casing and an outlet to the atmosphere, a branch passage from said duct to each said chamber, and constrictions in said duct forming small orifices of the same size between said inlet and the first branch passage, between successive branch passages and between the last branch passage and said outlet.

2. Apparatus as in claim 1, the width of the clearance between the shaft and the closely fitting portion of the box being less than the smallest transverse dimension of said orifices.

References Cited in the file of this patent
UNITED STATES PATENTS

| | | |
|---|---|---|
| 1,109,826 | Doble | Sept. 8, 1914 |
| 1,518,279 | Smoot | Dec. 9, 1924 |
| 1,943,578 | Bigelow et al. | Jan. 16, 1934 |
| 1,996,780 | Wheeler | Apr. 9, 1935 |
| 2,175,868 | Bentley | Oct. 10, 1939 |
| 2,466,025 | Hanson | Apr. 5, 1939 |
| 2,684,274 | Saxon | July 20, 1954 |

FOREIGN PATENTS

| | | |
|---|---|---|
| 704,032 | Great Britain | Feb. 17, 1954 |